United States Patent
Wells

(10) Patent No.: US 9,521,109 B2
(45) Date of Patent: Dec. 13, 2016

(54) SYSTEMS, METHODS, AND COMPUTER-READABLE MEDIA FOR ALLOCATION AND RENEWAL OF IP ADDRESSES

(71) Applicant: THE BOEING COMPANY, Chicago, IL (US)

(72) Inventor: Rudy Charles Wells, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 182 days.

(21) Appl. No.: 14/504,225

(22) Filed: Oct. 1, 2014

(65) Prior Publication Data

US 2016/0099912 A1    Apr. 7, 2016

(51) Int. Cl.
| | |
|---|---|
| G06F 15/177 | (2006.01) |
| G06F 15/16 | (2006.01) |
| H04L 29/12 | (2006.01) |
| G06F 15/173 | (2006.01) |

(52) U.S. Cl.
CPC ....... *H04L 61/2015* (2013.01); *H04L 61/2053* (2013.01)

(58) Field of Classification Search
CPC .......................... H04L 61/2015; H04L 61/2053
USPC ....................................................... 709/226
See application file for complete search history.

(56) References Cited

U.S. PATENT DOCUMENTS

| | | | | |
|---|---|---|---|---|
| 7,421,499 | B1 * | 9/2008 | Lanahan ............. | H04L 12/2463 709/220 |
| 7,577,146 | B2 * | 8/2009 | Arberg .............. | H04L 29/12273 370/392 |
| 7,929,452 | B2 * | 4/2011 | Diamant ........... | H04L 29/12009 370/252 |
| 7,937,494 | B2 * | 5/2011 | Droms ................ | H04L 61/2015 709/208 |
| 8,086,713 | B2 * | 12/2011 | Gandhewar ......... | H04L 61/2015 370/218 |
| 8,230,067 | B2 * | 7/2012 | Arberg ................ | H04L 29/1282 709/220 |
| 8,375,109 | B1 * | 2/2013 | Lange ................. | H04L 61/2053 709/221 |
| 8,498,268 | B1 * | 7/2013 | Faccin .............. | H04W 36/0011 370/331 |
| 8,618,717 | B2 * | 12/2013 | Mocanu .................. | H04W 8/26 310/328 |

(Continued)

*Primary Examiner* — Melvin H Pollack
(74) *Attorney, Agent, or Firm* — MH2 Technology Law Group LLP

(57) ABSTRACT

Embodiments relate to methods, devices, and computer-implemented methods for internet protocol ("IP") address assignment by a dynamic host configuration protocol ("DHCP") server. The method includes receiving, from a client device, a DHCP discovery message for allocation of an IP address; assigning, by a processor, an IP address to the client device for a first lease period based on the DHCP discovery message; providing the IP address that was assigned to the client device; receiving, from the client device, an IP address lease renewal request during the first lease period; and renewing the first lease period to establish a second lease period that is longer than the first lease period based on a length of time the IP address that was assigned is in use by the client device.

18 Claims, 4 Drawing Sheets

(56) References Cited

U.S. PATENT DOCUMENTS

| | | | | |
|---|---|---|---|---|
| 8,656,026 B1* | 2/2014 | Prasad | H04L 67/22 | 709/217 |
| 8,782,211 B1* | 7/2014 | Sharma | H04L 67/1036 | 709/224 |
| 8,832,007 B2* | 9/2014 | Nahum | H04L 41/0886 | 706/12 |
| 8,887,237 B2* | 11/2014 | Janakiraman | H04L 12/4641 | 713/150 |
| 8,972,542 B2* | 3/2015 | Christenson | H04L 41/0856 | 709/221 |
| 8,977,738 B2* | 3/2015 | Wilkerson | H04L 29/12066 | 709/220 |
| 9,300,627 B2* | 3/2016 | Danforth | H04L 67/327 | |
| 9,313,687 B2* | 4/2016 | Knutson | H04L 61/2038 | |
| 9,331,914 B2* | 5/2016 | Thyni | H04L 41/5054 | |
| 9,344,397 B2* | 5/2016 | Iyer | H04L 61/2015 | |
| 9,419,936 B2* | 8/2016 | Ko | H04L 29/12301 | |
| 2013/0067062 A1* | 3/2013 | Gaitonde | H04L 61/103 | 709/224 |
| 2013/0080614 A1* | 3/2013 | Iyer | H04L 61/2053 | 709/223 |
| 2015/0052253 A1* | 2/2015 | Johnson | H04L 61/1511 | 709/226 |
| 2015/0229604 A1* | 8/2015 | Pal | H04L 61/2007 | 370/254 |
| 2015/0237005 A1* | 8/2015 | Tian | H04L 61/2061 | 709/245 |
| 2015/0237527 A1* | 8/2015 | Knutson | H04W 28/0289 | 726/4 |
| 2015/0277529 A1* | 10/2015 | Olrog | G06F 1/3203 | 713/320 |
| 2015/0281172 A1* | 10/2015 | He | H04L 41/12 | 709/222 |
| 2015/0304274 A1* | 10/2015 | Zhang | H04L 61/2015 | 709/221 |
| 2016/0036770 A1* | 2/2016 | Chatterjee | H04L 61/2015 | 709/203 |

* cited by examiner

SYSTEMS, METHODS, AND COMPUTER-READABLE MEDIA FOR ALLOCATION AND RENEWAL OF IP ADDRESSES

FIELD

The present teachings relate to communication systems, and more particularly, to systems, methods, and computer-readable media for allocation and renewal of IP addresses.

BACKGROUND

DHCP stands for Dynamic Host Configuration Protocol and is used to automatically assign IP configuration to hosts connecting to a network. The Dynamic Host Configuration Protocol (DHCP) provides a framework for passing configuration information to hosts on a transmission control protocol/internet protocol ("TCPIP") network. DHCP is based on the Bootstrap Protocol (BOOTP). A DHCP client makes a request to a DHCP server that may or may not reside on the same subnet. The automatic distribution of IP configuration information to hosts eases the administrative burden of maintaining IP networks. In its simplest form, DHCP distributes the IP address, subnet mask and default gateway to a host, and can include other configuration parameters such as domain name servers (DNS) and NetBIOS configuration.

The DHC protocol allows pools or "scopes" of TCP/IP addresses to be defined. A DHCP server can temporarily allocate or "lease" these TCP/IP addresses to host devices. An IP address that is not used after the lease has expired, is returned to the pool of unallocated IP addresses. In addition, the DHCP server provides related configuration settings, such as the default gateway, Domain Name Service ("DNS") servers, subnet mask, etc., that are required for the proper functioning of TCP/IP.

Typically, IP addresses are leased to clients by a DHCP server for a predetermined fixed length of time. Prior to the expiration of the lease, the client can ask for a renewal of the lease for another time period. Usually, each lease period is the same, and is set for a predetermined period of time expressed in seconds. If clients remain connected to the network for a long period of time, the DHCP server can receive numerous repeated requests for IP lease renewal. For devices that are relatively location fixed, such as a network-enabled multifunction device (e.g., devices that preform the function of a printer, copier, scanner, and fax) or a desktop computer, the repeated IP lease renewal request can become burdensome to the DHCP server. IP pool depletion can occur when devices are removed from the network before the fixed lease period has expired. Examples are laptops and other portable devices which reside for only short periods of time.

Accordingly, an improved IP lease renewal technique is desired that best matches the DHCP Client's needs.

SUMMARY

In accordance with aspects of the present disclosure, a computer-implemented method for internet protocol ("IP") address assignment by a dynamic host configuration protocol ("DHCP") server is disclosed. The method can comprise receiving, from a client device, a DHCP discovery message for allocation of an IP address; assigning, by a processor, an IP address to the client device for a first lease period based on the DHCP discovery message; providing the IP address that was assigned to the client device; receiving, from the client device, an IP address lease renewal request during the first lease period; and renewing the first lease period to establish a second lease period that is longer than the first lease period based on a length of time the IP address that was assigned is in use by the client device.

The method can further comprise increasing the length of time of the second lease period, wherein the second lease period is greater than the first least period.

The method can further comprise renewing the second lease period to establish a third lease period, wherein the third lease period is greater than the second lease period.

The lease period increases in relation to the length of time the client device remains bound to the IP address.

The DHCP server can store the lease period history of the client device. The DHCP server can establish a first reconnection lease period for the client device upon receiving a reconnection IP address request, wherein the first reconnection lease period is based on a previous longest duration lease period stored in the lease period history for the client device.

In accordance with aspects of the present disclosure, a dynamic host configuration protocol ("DHCP") server is disclosed that can comprise at least one processor; and a non-transitory computer-readable medium comprising instructions that cause the at least one processor to perform a method comprising: receiving, from a client device, a DHCP discovery message for allocation of an IP address; assigning an IP address to the client device for a first lease period based on the DHCP discovery message; providing the IP address that was assigned to the client device; receiving, from the client device, an IP address lease renewal request during the first lease period; and renewing the first lease period to establish a second lease period that is longer than the first lease period based on a length of time the IP address that was assigned is in use by the client device.

The one processor can further perform the method comprising increasing the length of time of the second lease period, wherein the second lease period is greater than the first least period.

The one processor can further perform the method comprising renewing the second lease period to establish a third lease period, wherein the third lease period is greater than the second lease period. The lease period can increase in relation to a length of time the client device remains connected to the subnet. The DHCP server can store the lease period history of the client device. The DHCP server can establish a first reconnection lease period for the client device upon receiving a reconnection IP address request, wherein the first reconnection lease period is based on a previous longest duration lease period stored in the lease period history for the client device.

In accordance with aspects of the present disclosure, a computer-readable storage medium comprising instruction that cause one or more processors to perform a method is disclosed. The method can comprise receiving, from a client device, a DHCP discovery message for allocation of an IP address; assigning, by a processor, an IP address to the client device for a first lease period based on the DHCP discovery message; providing the IP address that was assigned to the client device; receiving, from the client device, an IP address lease renewal request during the first lease period; and renewing the first lease period to establish a second lease period that is longer than the first lease period based on a length of time the IP address that was assigned is in use by the client device.

The computer-readable storage medium can further comprise instructions for increasing the length of time of the second lease period, wherein the second lease period is greater than the first least period.

The computer-readable storage medium can further comprise instructions for renewing the second lease period to establish a third lease period, wherein the third lease period is greater than the second lease period. The lease period can increase in relation to the length of time the client device remains connected to the subnet. The DHCP server can store the lease period history of the client device. The DHCP server can establish a first reconnection lease period for the client device upon receiving a reconnection IP address request, wherein the first reconnection lease period is based on a previous longest duration lease period stored in the lease period history for the client device.

DESCRIPTION OF DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to exemplary embodiments of the present teachings, which are illustrated in the accompanying drawings. Where possible the same reference numbers will be used throughout the drawings to refer to the same or like parts.

DHCP provides a framework for passing configuration information dynamically to hosts on TCP/IP network. A DHCP client is an Internet host using DHCP to obtain configuration parameters such as an IP address. A DHCP relay agent is any host that forwards DHCP packets between clients and servers. Relay agents are used to forward requests and replies between clients and servers when they are not on the same physical subnet. Relay agent forwarding is distinct from the normal forwarding of an IP router, where IP datagrams are switched between networks somewhat transparently. By contrast, relay agents receive DHCP messages and then generate a new DHCP message to send on another interface.

Figure 1:
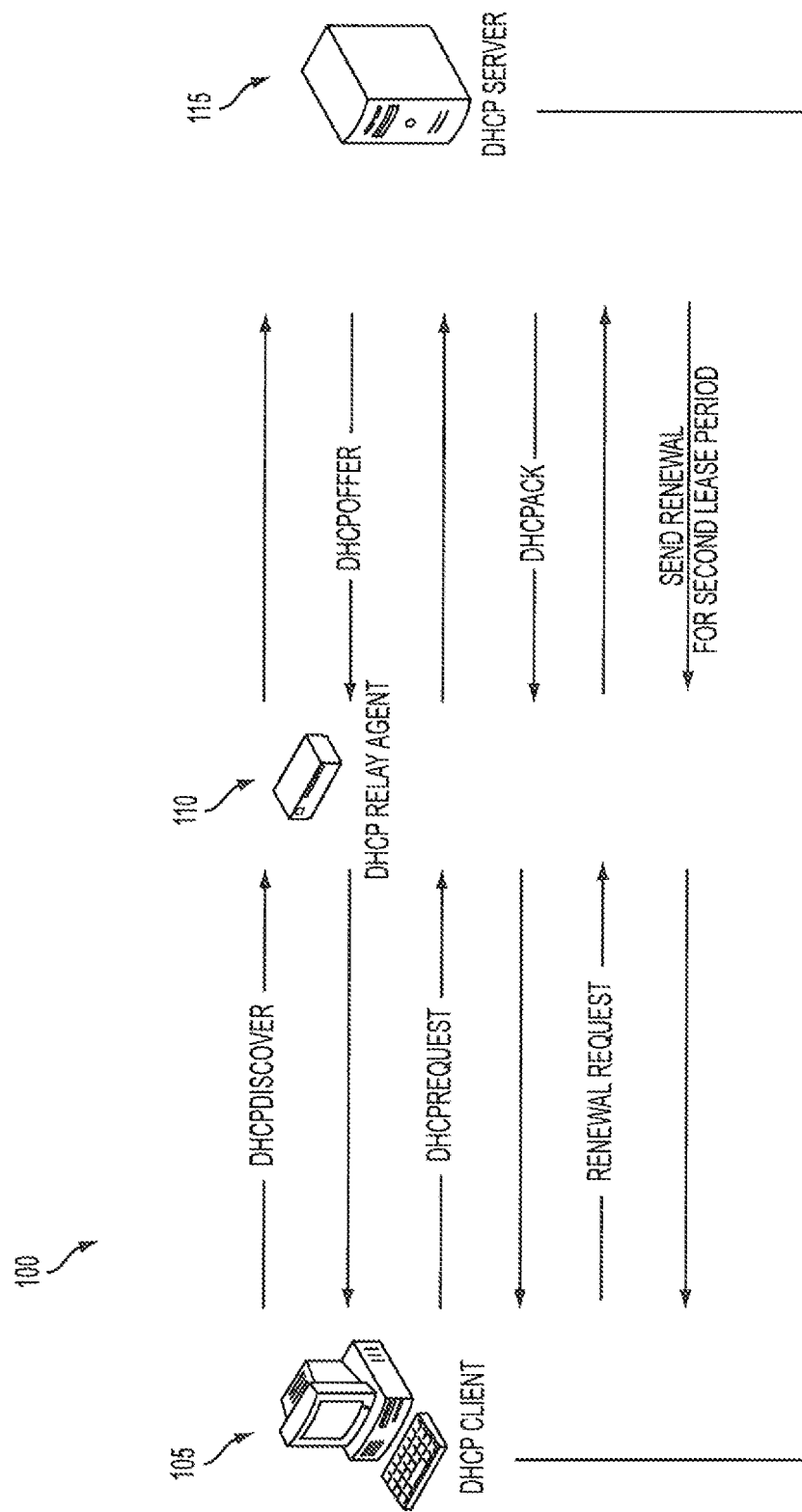
FIG. 1 illustrates an example block diagram illustrating a system according to the present teachings.

FIG. 1 shows the actions that occur when DHCP client 105 requests an IP address from DHCP server 115. DHCP client 105 sends a DHCPDISCOVER broadcast message to locate DHCP server 115. For example, DHCP client 105 starts the DHCP process by issuing a DHCPDISCOVER message to its local subnet on UDP port 67. Since DHCP client 105 does not know what subnet it belongs to, a general broadcast is used (destination address 255.255.255.255). If DHCP server 115 is located on a different subnet, DHCP-relay agent 110 is used. DHCP relay agent 110 forwards the packets between DHCP client 105 and DHCP server 115. DHCP relay agent 110 may communicate and service numerous DHCP clients and each DHCP client may need to directly communicate with DHCP server 115 for, for example, IP address renewal or release. DHCP server 115 may also service other network elements, which may provide services for other clients. For example, DHCP-relay agent 110 forwards the DHCPDISCOVER message to a subnet that contains DHCP server 115. DHCP server 115 offers configuration parameters such as an IP address, Subnet Mask, Gateway, a DNS search domain NTP server and a lease for the IP address to DHCP client 105 in a DHCPOFFER message. The DHCPOFFER message is sent as a broadcast on UDP port 68. DHCP client 105 will know that the DHCPOFFER message is intended for it because the MAC address of DHCP client 105, as well as the message ID number that is generated by the DHCP client 105, is included in the message. If DHCP client 105 is on a different subnet than DHCP server 115, the message is sent to DHCP-relay agent 110. DHCP-relay agent 110 broadcasts the DHCPOFFER on subnet of DHCP client 105.

After DHCP client 105 receives the DHCPOFFER, DHCP client 105 sends a DHCPREQUEST broadcast message that is received at DHCP server 115. The DHCPREQUEST message informs DHCP server 115 that DHCP client 105 accepts the IP lease offered in the DHCPOFFER message.

DHCP server 115 will send a DHCPACK message to DHCP client 105 to acknowledge the DHCPREQUEST. The DHCPACK message contains the configuration information that was requested by DHCP client 105. After DHCP client 105 receives the DHCPACK, DHCP client 105 binds the IP address for a first lease period and is ready to communicate on the network.

DHCP server 115 typically maintains lease time information for the clients. As a result, the client's DHCP renewal or release is processed by DHCP server 115. Prior to the ending of the first lease and at about the midpoint of the lease period (e.g., at about 35% to about 65%, at about 40% to about 60%, or at about 45% to about 55% of the lease period), DHCP client 105 requests a renewal of the lease. DHCP server 115 can then renew the lease for a second lease period that is longer than the first lease period. Subsequent lease periods are then set at an ever increasing time period until a maximum lease period is reached. For example, each subsequent lease period can increase by a factor of 2, or any other factor, up to a maximum period set by DHCP administration.

Figure 2:
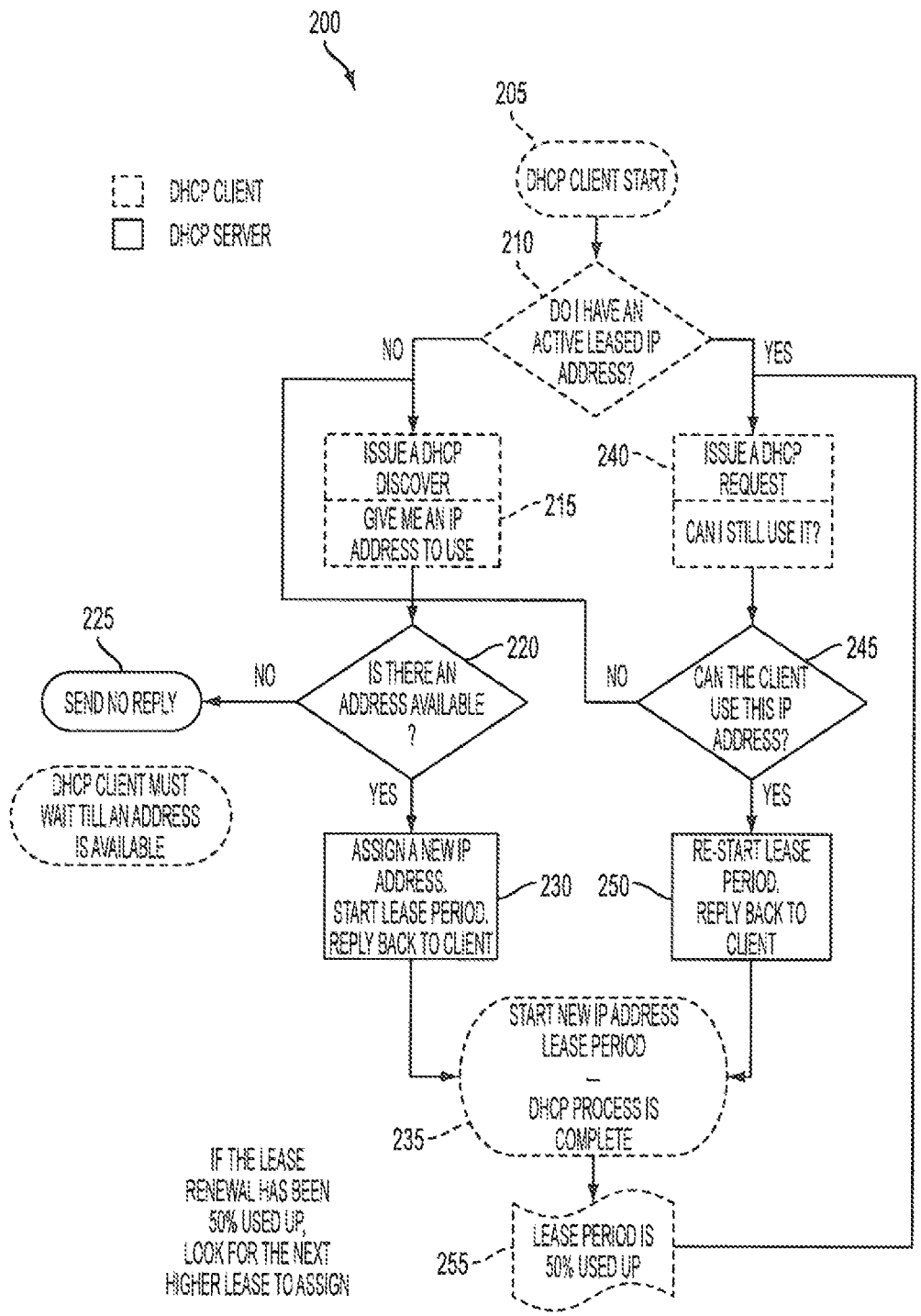
FIG. 2 illustrates an example flowchart for IP address lease assignment and renewal according to the present teachings.

FIG. 2 is an example process for DHCP lease negotiation 200, according to the present teachings. It is noted that FIG. 2 illustrates one example of the lease negotiation, and that the negotiations may be performed in various manners according to the present disclosure. It is further noted that the various steps shown may be performed in different orders or omitted, or various additional steps may be performed as desired.

The DHCP lease negotiation 200 can begin at 205 where DHCP client 105 starts. At 210, DHCP client 105 makes a determination as to whether the DHCP client 105 has an active leased IP address. If the determination at 210 is negative, then DHCP client 105 issues a DHCP discover request message asking DHCP server 115 to assign an IP to use at 215. At 220, DHCP server 115 makes a determination as to whether an IP address is available. If the result of the determination at 220 is negative, DHCP server 115 takes no further action at 225. DHCP client 105 then waits until an address is available. For example, DHCP client 105 may initiate another DHCP discover request after a predetermined time period has elapsed. If the result of the determination at 220 is positive, DHCP server 115 can then assign a new IP address, start a lease period, and reply back to DHCP client 105 at 230. At 235, DHCP client 105 starts a new IP address lease period and the DHCP process is then completed.

If the result of the determination that the lease period has not expired at 210 is positive, a Yes response, then DHCP client 105 issues a DHCP request to determine whether or not DHCP client 105 can use the leased IP address at 240. At 245, DHCP server 115 makes a determination as to whether DHCP client 105 can use the previously leased IP address. If the result of the determination at 245 is negative, then the processes progress back to 215 where DHCP client 105 issues a DHCP discover request message asking DHCP server 115 to assign an IP to use. If the result of the determination at 245 is positive, then DHCP server 115 re-starts the lease period and replies back to DHCP client 105 at 250 and DHCP client 105 starts a new IP address lease period and the DHCP process is then completed at 235.

Once the lease is about 50% used up, between about 35% to about 65%, between about 40% to about 60%, or at about 45% to about 55% of the lease period, DHCP client 105, at 255, progresses back to 215 where DHCP client 105 issues another DHCP request message asking DHCP server 115 to renew the leased IP address. The next lease period can then be set for the next higher lease period.

Figure 3:
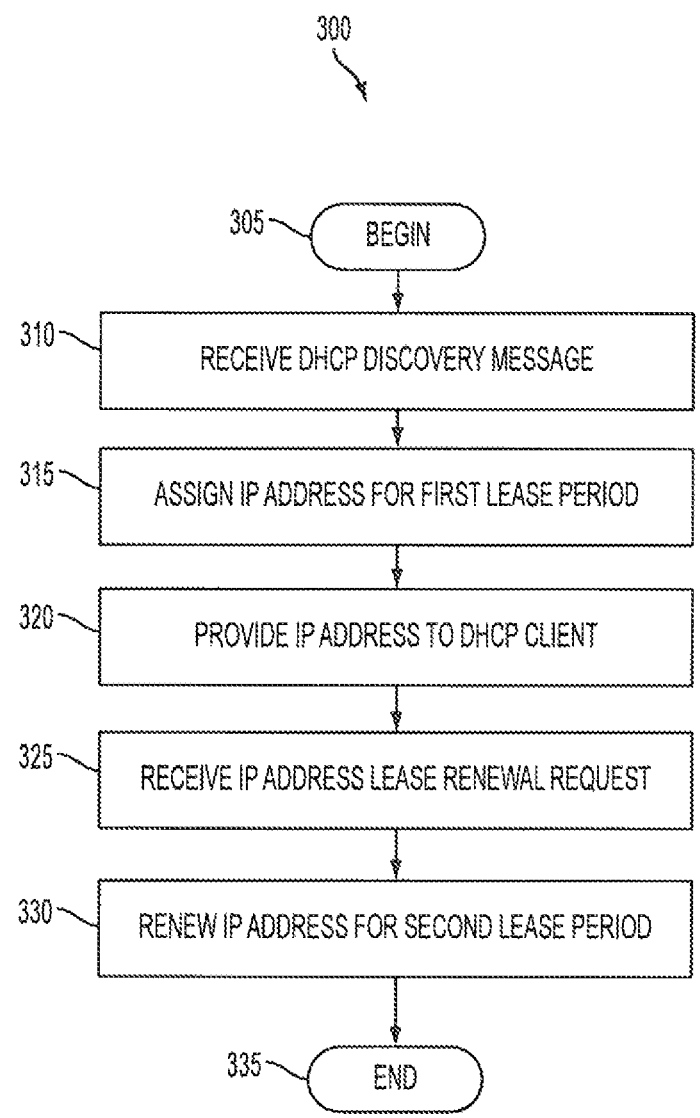
FIG. 3 illustrates another example flowchart for IP address lease assignment and renewal according to the present teachings.

FIG. 3 is an example process for DHCP server 115 to perform DHCP lease negotiation 300, according to the present teachings. It is noted that FIG. 3 illustrates one example of the lease negotiation, and that the negotiations may be performed in various manners according to the present disclosure. It is further noted that the various steps shown may be performed in different orders or omitted, or various additional steps may be performed, as desired.

The DHCP lease negotiation 300 can begin at 305 and, at 310, DHCP server 115 receives a DHCP discovery message from DHCP client 105 for allocation of an IP address. At 315, DHCP server 115 assigns an IP address to DHCP client 105 for a first lease period based on the DHCP discovery message. At 320, DHCP server 115 provides the IP address that was assigned to DHCP client 105. At 325, DHCP server 155 receives an IP address lease renewal request from DHCP client 105 during the first lease period. For example, the renewal request can begin about the midpoint of the lease period, including about between about 35% to about 65%, between about 40% to about 60%, or at about 45% to about 55% of the lease period. At 330, DHCP server 115 renews the first lease period to establish a second lease period that is longer than the first lease period based on a length of time the IP address that was assigned is in use by DHCP client 105. At 335, the process can end.

Subsequent renewal requests from DHCP client 105 can be processed by DHCP server 115 for increasingly longer lease periods up to a predetermined maximum lease period that can be set by a network administrator. For example, the first lease period can be set at 2 hours, a second lease period can be set at 4 hours, a third lease period can be set at 8 hours, and so forth, until the predetermined maximum lease period is reached. Other time intervals can also be used, as long as each successive lease period is longer than the previous lease period up to the maximum predetermined lease period. The lease period can increase in relation to the length of time DHCP client 105 remains bound to the IP address. For example, devices that are relatively stationary within a particular network, such as a multifunctional device, would not need to continually request a short-lived IP address from the DHCP server 115, but could be allocated a longer-lived IP address based on the present disclosure. This reduces the computational resources that the DHCP server 115 spends on these types of more stationary devices. In contrast, devices that stay for shorter periods of time within the network do not require use of longer-leased IP addresses. Thus, the DHCP server 115 can accommodate devices that have different lifetimes within the network in a more efficient manner.

Figure 4:
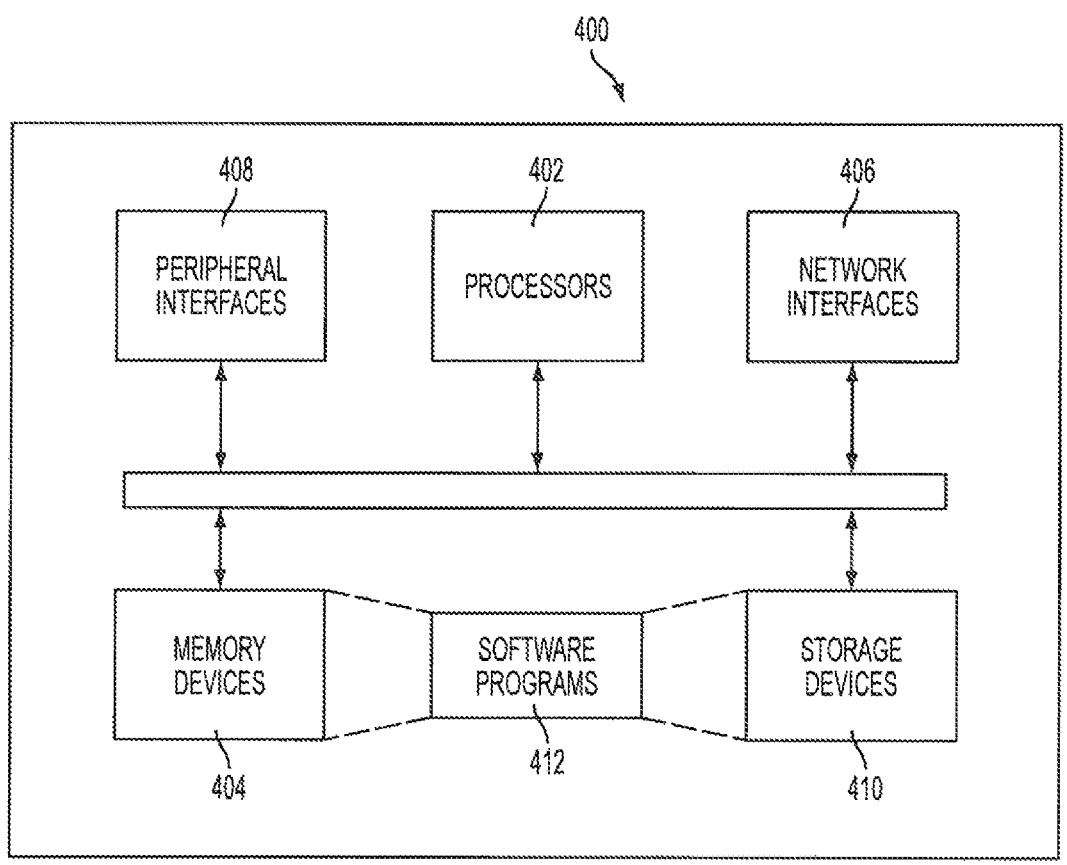
FIG. 4 illustrates an example block diagram illustrating an internal architecture of the device according to the present teachings.

Embodiments of the disclosure may also include one or more systems for implementing one or more embodiments of the method. FIG. 4 illustrates a schematic view of such a computing or processor system 400, according to an embodiment. The processor system 400 may include one or more processors 402 of varying core configurations (including multiple cores) and clock frequencies. The one or more processors 402 may be operable to execute instructions, apply logic, etc. It will be appreciated that these functions may be provided by multiple processors or multiple cores on a single chip operating in parallel and/or communicably linked together. In at least one embodiment, the one or more processors 402 may be or include one or more GPUs.

The processor system 400 may also include a memory system, which may be or include one or more memory devices and/or computer-readable media 404 of varying physical dimensions, accessibility, storage capacities, etc. such as flash drives, hard drives, disks, random access memory, etc., for storing data, such as images, files, and program instructions for execution by the processor 402. In an embodiment, the computer-readable media 404 may store instructions that, when executed by the processor 402, are configured to cause the processor system 400 to perform operations. For example, execution of such instructions may cause the processor system 400 to implement one or more portions and/or embodiments of the method described above.

The processor system 400 may also include one or more network interfaces 406. The network interfaces 406 may include any hardware, applications, and/or other software. Accordingly, the network interfaces 406 may include Ethernet adapters, wireless transceivers, PCI interfaces, and/or serial network components, for communicating over wired or wireless media using protocols, such as Ethernet, wireless Ethernet, etc.

The processor system 400 may further include one or more peripheral interfaces 408, for communication with a display screen, projector, keyboards, mice, touchpads, sensors, other types of input and/or output peripherals, and/or the like. In some implementations, the components of processor system 400 need not be enclosed within a single enclosure or even located in close proximity to one another, but in other implementations, the components and/or others may be provided in a single enclosure.

The memory device 404 may be physically or logically arranged or configured to store data on one or more storage devices 410. The storage device 410 may include one or more file systems or databases in any suitable format. The storage device 410 may also include one or more software programs 412, which may contain interpretable or executable instructions for performing one or more of the disclosed processes. When requested by the processor 402, one or more of the software programs 412, or a portion thereof, may be loaded from the storage devices 410 to the memory devices 404 for execution by the processor 402.

Those skilled in the art will appreciate that the above-described componentry is merely one example of a hardware configuration, as the processor system 400 may include any type of hardware components, including any necessary accompanying firmware or software, for performing the disclosed implementations. The processor system 400 may also be implemented in part or in whole by electronic circuit components or processors, such as application-specific integrated circuits (ASICs) or field-programmable gate arrays (FPGAs).

The foregoing description of the present disclosure, along with its associated embodiments and examples, has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments.

For example, the same techniques described herein with reference to the processor system 400 may be used to execute programs according to instructions received from another program or from another processor system altogether. Similarly, commands may be received, executed, and their output returned entirely within the processing and/or memory of the processor system 400. Accordingly, neither a visual interface command terminal nor any terminal at all is strictly necessary for performing the described embodiments.

Likewise, the steps described need not be performed in the same sequence discussed or with the same degree of separation. Various steps may be omitted, repeated, combined, or divided, as necessary to achieve the same or similar objectives or enhancements. Accordingly, the present disclosure is not limited to the above-described embodiments, but instead is defined by the appended claims in light of their full scope of equivalents. Further, in the above description and in the below claims, unless specified otherwise, the term "execute" and its variants are to be interpreted as pertaining to any operation of program code or instructions on a device, whether compiled, interpreted, or run using other techniques.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computer-implemented method for internet protocol ("IP") address assignment by a dynamic host configuration protocol ("DHCP") server, the method comprising:
   receiving, from a client device, a DHCP discovery message for allocation of an IP address;
   assigning, by a processor, an IP address to the client device for a first lease period based on the DHCP discovery message;
   providing the IP address that was assigned to the client device;
   receiving, from the client device, an IP address lease renewal request during the first lease period;
   determining a length of time the IP address that was assigned is in use by the client device;
   renewing the first lease period to establish a second lease period that is always longer than the first lease period based on the length of time the IP address that was assigned is in use by the client device; and
   providing the IP address for the second lease period.

2. The method of claim 1, further comprising increasing the length of time of the second lease period, wherein the second lease period is greater than the first least period.

3. The method of claim 2, further comprising renewing the second lease period to establish a third lease period, wherein the third lease period is greater than the second lease period.

4. The method of claim 1, wherein the lease period increases in relation to the length of time the client device remains bound to the IP address.

5. The method of claim 1, wherein the DHCP server stores the lease period history of the client device.

6. The method of claim 5, wherein the DHCP server establishes a first reconnection lease period for the client device upon receiving a reconnection IP address request, wherein the first reconnection lease period is based on a previous longest duration lease period stored in the lease period history for the client device.

7. A dynamic host configuration protocol ("DHCP") server comprising:
   at least one processor; and
   a non-transitory computer readable medium comprising instructions that cause the at least one processor to perform a method comprising:
   receiving, from a client device, a DHCP discovery message for allocation of an IP address;
   assigning an IP address to the client device for a first lease period based on the DHCP discovery message;
   providing the IP address that was assigned to the client device;
   receiving, from the client device, an IP address lease renewal request during the first lease period;
   determining a length of time the IP address that was assigned is in use by the client device;
   renewing the first lease period to establish a second lease period that is always longer than the first lease period based on the length of time the IP address that was assigned is in use by the client device; and
   providing the IP address for the second lease period.

8. The device of claim 7, wherein the at least one processor further performs the method comprising increasing the length of time of the second lease period, wherein the second lease period is greater than the first least period.

9. The device of claim 8, wherein the at least one processor further performs the method comprising renewing the second lease period to establish a third lease period, wherein the third lease period is greater than the second lease period.

10. The device of claim 7, wherein the lease period increases in relation to a length of time the client device remains connected to the IP address.

11. The device of claim 7, wherein the DHCP server stores the lease period history of the client device.

12. The device of claim 11, wherein the DHCP server establishes a first reconnection lease period for the client device upon receiving a reconnection IP address request, wherein the first reconnection lease period is based on a previous longest duration lease period stored in the lease period history for the client device.

13. A computer-readable storage medium comprising instruction that cause one or more processors to perform a method comprising:
   receiving, from a client device, a DHCP discovery message for allocation of an IP address;
   assigning, by a processor, an IP address to the client device for a first lease period based on the DHCP discovery message;
   providing the IP address that was assigned to the client device;
   receiving, from the client device, an IP address lease renewal request during the first lease period;
   determining a length of time the IP address that was assigned is in use by the client device;
   renewing the first lease period to establish a second lease period that is always longer than the first lease period based on the length of time the IP address that was assigned is in use by the client device; and
   providing the IP address for the second lease period.

14. The computer-readable storage medium of claim 13, further comprising increasing the length of time of the second lease period, wherein the second lease period is greater than the first least period.

15. The computer-readable storage medium of claim 14, further comprising renewing the second lease period to establish a third lease period, wherein the third lease period is greater than the second lease period.

16. The computer-readable storage medium of claim 13, wherein the lease period increases in relation to the length of time the client device remains connected to the IP address.

17. The computer-readable storage medium of claim 13, wherein the DHCP server stores the lease period history of the client device.

18. The computer-readable storage medium of claim 17, wherein the DHCP server establishes a first reconnection lease period for the client device upon receiving a reconnection IP address request, wherein the first reconnection lease period is based on a previous longest duration lease period stored in the lease period history for the client device.

* * * * *